(12) United States Patent
Alano et al.

(10) Patent No.: US 10,294,843 B2
(45) Date of Patent: May 21, 2019

(54) MIXER AND DOSER CONE ASSEMBLY

(71) Applicant: FAURECIA EMISSIONS CONTROL TECHNOLOGIES, USA, LLC, Columbus, IN (US)

(72) Inventors: Eduardo Alano, Columbus, IN (US); Philip M. Dimpelfeld, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 15/365,440

(22) Filed: Nov. 30, 2016

(65) Prior Publication Data

US 2017/0082007 A1    Mar. 23, 2017

Related U.S. Application Data

(63) Continuation of application No. PCT/US2014/040588, filed on Jun. 3, 2014.

(51) Int. Cl.
*F01N 3/20* (2006.01)
*F01N 3/36* (2006.01)
(Continued)

(52) U.S. Cl.
CPC ............. *F01N 3/208* (2013.01); *B01D 53/79* (2013.01); *B01D 53/92* (2013.01); *B01D 53/94* (2013.01);
(Continued)

(58) Field of Classification Search
CPC ............... F01N 2610/02; F01N 3/2066; F01N 2610/1453; F01N 2240/20; F01N 3/2892;
(Continued)

(56) References Cited

U.S. PATENT DOCUMENTS 4,054,418 A    10/1977 Miller et al.
5,606,856 A     3/1997 Linder
(Continued)

FOREIGN PATENT DOCUMENTS

DE    4417238     3/2003
DE    19806265    7/2004
(Continued)

OTHER PUBLICATIONS

PCT International Search Report completed by the ISA/KR dated Feb. 5, 2015 and issued in connection with PCT/US2014/040588.
(Continued)

*Primary Examiner* — Amber R Orlando
*Assistant Examiner* — Syed T Iqbal
(74) *Attorney, Agent, or Firm* — Barnes & Thornburg LLP (57) ABSTRACT

A vehicle exhaust system includes an exhaust component defining an engine exhaust gas passageway and which includes an opening. A doser defines a doser axis and extends to a doser tip that is configured to spray a reducing agent into the engine exhaust gas passageway through the opening. A cone has a base end positioned adjacent the opening such that an annular gap is formed within the exhaust component around the doser tip. Exhaust gas is directed into the base end of the cone through the annular gap in a direction transverse to the doser axis. This configuration reduces deposit formation while still allowing the reducing agent to be thoroughly mixed with engine exhaust gases prior to introduction of the mixture into a downstream exhaust component.

17 Claims, 6 Drawing Sheets

(51) Int. Cl.

| | | |
|---|---|---|
| *F01N 13/08* | (2010.01) | |
| *B01D 53/94* | (2006.01) | |
| *F01N 3/28* | (2006.01) | |
| *B01F 5/04* | (2006.01) | |
| *B01F 5/06* | (2006.01) | |
| *B01F 3/04* | (2006.01) | |
| *B01D 53/79* | (2006.01) | |
| *B01D 53/92* | (2006.01) | |
| *F01N 3/10* | (2006.01) | |
| *F01N 3/021* | (2006.01) | |
| *F01N 3/035* | (2006.01) | |
| *B01F 5/00* | (2006.01) | |

(52) U.S. Cl.
CPC ........ *B01F 3/04049* (2013.01); *B01F 5/0451* (2013.01); *B01F 5/0498* (2013.01); *B01F 5/0653* (2013.01); *F01N 3/20* (2013.01); *F01N 3/206* (2013.01); *F01N 3/2066* (2013.01); *F01N 3/2892* (2013.01); *B01D 2251/2067* (2013.01); *B01F 2005/0091* (2013.01); *F01N 3/021* (2013.01); *F01N 3/035* (2013.01); *F01N 3/103* (2013.01); *F01N 2240/20* (2013.01); *F01N 2610/02* (2013.01); *F01N 2610/1453* (2013.01); *Y02A 50/2325* (2018.01); *Y02T 10/24* (2013.01)

(58) Field of Classification Search
CPC ........... F01N 2610/08; F01N 2610/102; F01N 2610/03; F01N 2610/11; F01N 3/035; F01N 3/2033; F01N 3/36; F01N 13/009; F01N 2240/14; F01N 13/0097; F01N 13/08; F01N 2470/24; F01N 2610/10; F01N 3/025; F01N 3/0253; F01N 2470/18; F01N 2470/22; F01N 2570/14; F01N 2610/146; F01N 3/103; F01N 13/14; F01N 2240/02; F01N 2240/16; F01N 2250/02; F01N 2260/024; F01N 2610/00; F01N 2610/14; F01N 2610/1426; F01N 2610/1473; F01N 3/208; F01N 3/28; F01N 11/002; F01N 13/008; F01N 13/141; F01N 13/16; F01N 13/1816; F01N 13/1822; F01N 1/084; F01N 1/12; F01N 2240/25; F01N 2240/30; F01N 2240/40; F01N 2250/04; F01N 2250/06; F01N 2260/04; F01N 2260/20; F01N 2450/24; F01N 2470/02; F01N 2470/04; F01N 2470/20; F01N 2470/30; F01N 2490/04; F01N 2490/06; F01N 2510/08; F01N 2510/14; F01N 2530/26; F01N 2560/026; F01N 2560/06; F01N 2560/07; F01N 2610/06; F01N 2610/107; F01N 2610/1433; F01N 2610/1486; F01N 2610/1493; F01N 2900/1411; F01N 2900/1811; F01N 3/021; F01N 3/0256; F01N 3/05; F01N 3/0842; F01N 3/0871; F01N 3/206; F01N 3/22; F01N 3/26; F01N 3/2882; F01N 3/30; F01N 3/306; F01N 3/32; Y02T 10/24; Y02T 10/26; Y02T 10/20; Y02T 10/146; Y02T 10/47; B01D 53/9431; B01D 53/90; B01D 2251/2067; B01D 53/9495; B01D 53/92; B01D 53/8631; B01D 53/8653; B01D 53/8696; B01F 3/04049; B01F 5/0268; B01F 5/0473; B01F 5/0602; B01F 5/0659; B01F 15/063; B01F 2005/0634; B01F 2005/0636; B01F 2005/0638; B01F 2015/062; B01F 3/02; B01F 5/0057; B01F 5/04; B01F 5/045; B01F 5/0451; B01F 5/0463; B01F 5/0471; B01F 5/0498; B01F 5/061; B01F 5/0614; B01F 5/0616; B01F 5/0644; B01F 5/0646; B01F 5/0653; Y02A 50/2325; Y02A 50/2322; Y02A 50/2344; Y02C 20/10; B01J 35/04; C01C 1/08; C01C 1/086; F01P 2060/16; F01P 2060/18; F02B 1/04; F02B 35/00; F02B 37/00; F02B 37/20; F02B 47/08; F02M 26/15; F02M 26/22; F16L 41/008; F16L 41/12; F23D 11/103; F23D 2900/21003; F23D 91/02; F23G 7/065; F23G 7/07; F23J 15/003; G01D 11/30; Y10T 428/24149
See application file for complete search history.

(56) References Cited

U.S. PATENT DOCUMENTS

| | | | |
|---|---|---|---|
| 6,382,600 B1 | 5/2002 | Mahr | |
| 6,539,708 B1 | 4/2003 | Hofmann | |
| 7,509,799 B2 | 3/2009 | Amou | |
| 7,980,063 B2 | 7/2011 | Cooke | |
| 8,438,839 B2* | 5/2013 | Floyd | B01F 3/04049 |
| | | | 239/129 |
| 8,661,792 B2 | 3/2014 | Greber | |
| 8,800,276 B2* | 8/2014 | Levin | B01F 5/0268 |
| | | | 261/79.2 |
| 9,180,407 B2 | 11/2015 | De Rudder | |
| 2003/0110763 A1 | 6/2003 | Pawson | |
| 2003/0226412 A1 | 12/2003 | Rumminger | |
| 2006/0070374 A1 | 4/2006 | Gaiser | |
| 2006/0218902 A1 | 10/2006 | Arellano | |
| 2007/0092413 A1 | 4/2007 | Hirata | |
| 2007/0163241 A1 | 7/2007 | Meingast | |
| 2007/0193252 A1 | 8/2007 | McKinley | |
| 2008/0011777 A1 | 1/2008 | Cooke | |
| 2008/0011780 A1 | 1/2008 | Cooke | |
| 2008/0022670 A1 | 1/2008 | Ichikawa | |
| 2008/0092526 A1 | 4/2008 | Kunkel | |
| 2008/0163612 A1 | 7/2008 | Gaiser | |
| 2008/0282687 A1 | 11/2008 | Park | |
| 2009/0044524 A1 | 2/2009 | Fujino | |
| 2009/0064668 A1 | 3/2009 | Herrick et al. | |
| 2009/0084094 A1 | 4/2009 | Goss | |
| 2009/0120066 A1 | 5/2009 | VanderGriend | |
| 2009/0127511 A1 | 5/2009 | Bruck | |
| 2010/0005790 A1 | 1/2010 | Zhang | |
| 2010/0071355 A1 | 3/2010 | Brown | |
| 2010/0101222 A1 | 4/2010 | Oesterle | |
| 2010/0186393 A1 | 7/2010 | Kowada | |
| 2010/0212301 A1 | 8/2010 | De Rudder et al. | |
| 2011/0107743 A1 | 5/2011 | Ranganathan | |
| 2012/0174561 A1* | 7/2012 | Troxler | F01N 3/2066 |
| | | | 60/274 |
| 2012/0216513 A1 | 8/2012 | Greber et al. | |
| 2012/0322012 A1 | 12/2012 | Tsumagari | |
| 2013/0164183 A1 | 6/2013 | Iijima | |
| 2013/0291519 A1 | 11/2013 | Patel et al. | |
| 2014/0325967 A1* | 11/2014 | Kimura | F01N 3/2066 |
| | | | 60/286 |

FOREIGN PATENT DOCUMENTS

| | | |
|---|---|---|
| DE | 10312212 | 9/2006 |
| DE | 102005061145 | 6/2007 |
| DE | 202007010324 | 11/2008 |
| DE | 102007052262 | 5/2009 |
| DE | 202008001022 | 6/2009 |
| DE | 102008008563 | 8/2009 |
| DE | 102008040476 | 4/2013 |

(56) References Cited

FOREIGN PATENT DOCUMENTS

| | | |
|---|---|---|
| DE | 10241697 | 5/2016 |
| EP | 0268026 | 8/1993 |
| EP | 1314864 | 1/2007 |
| EP | 2221459 | 8/2010 |
| EP | 2282026 | 2/2011 |
| EP | 2295755 | 3/2011 |
| EP | 2325452 A1 | 5/2011 |
| EP | 2405109 | 1/2012 |
| EP | 2492465 | 8/2012 |
| EP | 2465602 | 11/2013 |
| EP | 2687286 | 1/2014 |
| EP | 2295756 | 3/2014 |
| EP | 2860369 | 4/2015 |
| EP | 2860370 | 4/2015 |
| EP | 2325452 | 5/2015 |
| EP | 2884069 | 6/2015 |
| EP | 2980379 | 2/2016 |
| FR | 2897646 | 8/2008 |
| FR | 2965011 | 3/2012 |
| FR | 2977632 | 1/2013 |
| JP | H2223624 | 2/1989 |
| JP | H0296212 | 4/1990 |
| JP | 2009030560 A | 2/2009 |
| JP | 2013002367 | 1/2013 |
| KR | 2012053494 A | 5/2012 |
| SE | 531199 | 1/2009 |
| WO | 9701387 | 1/1997 |
| WO | 2008027146 | 3/2008 |
| WO | 2008034981 | 3/2008 |
| WO | 2009068136 | 6/2009 |
| WO | 2010078052 | 7/2010 |
| WO | 2015151282 | 10/2010 |
| WO | 2011056676 | 5/2011 |
| WO | 2011106487 | 9/2011 |
| WO | 2011110885 | 9/2011 |
| WO | 2011139953 | 11/2011 |
| WO | 2011163395 | 12/2011 |
| WO | 2013099312 | 12/2011 |
| WO | 2013099313 | 12/2011 |
| WO | 2013099314 | 12/2011 |
| WO | 2012013562 | 2/2012 |
| WO | 2012044233 | 4/2012 |
| WO | 2012047159 | 4/2012 |
| WO | 2012050509 | 4/2012 |
| WO | 2012052560 | 4/2012 |
| WO | 2012053960 | 4/2012 |
| WO | 2012054437 | 4/2012 |
| WO | 2012096971 | 7/2012 |
| WO | 2014017310 | 7/2012 |
| WO | 2012120000 | 9/2012 |
| WO | 2014077023 | 11/2012 |
| WO | 2013010700 | 1/2013 |
| WO | 2014112063 | 1/2013 |
| WO | 2014112067 | 1/2013 |
| WO | 2014112072 | 1/2013 |
| WO | 2014112073 | 1/2013 |
| WO | 2014115461 | 1/2013 |
| WO | 2013035112 | 3/2013 |
| WO | 2013036406 | 3/2013 |
| WO | 2013048309 | 4/2013 |
| WO | 2013112154 | 8/2013 |
| WO | 2015018971 | 8/2013 |
| WO | 2015020820 | 8/2013 |
| WO | 2013178321 | 12/2013 |
| WO | 2014047091 | 3/2014 |
| WO | 2014051617 | 4/2014 |
| WO | 2014182832 | 11/2014 |
| WO | 201574926 | 5/2015 |
| WO | 201576765 | 5/2015 |
| WO | 2015130640 | 9/2015 |
| WO | 2015187128 | 12/2015 |
| WO | 2016013319 | 1/2016 |

OTHER PUBLICATIONS

International Search Report for PCT International Application Serial No. PCT/US2016/058114 received Jan. 17, 2017, 16FECT013 PCT ‖ 9 pages.
Jean et al., New Concepts for the Urea Injection Area in SCR Exhaust Systems for Passenger Cars, Aachen Congress, p. 1373-2010, 2010, 18 pages.
Rusch et al., Urea SCR Interaction of Spray Generation and Exhaust System, 3rd International CTI Forum SCR-System, Bonn, Apr. 2008, 30 pages.
DE102005061145A1 translation.
Office Action dated Jan. 19, 2017 for U.S. Appl. No. 12/670,126; (pp. 1-10).
Supplementary European Search Report for European Application No. EP14893926.7-1004/3152419, dated Jan. 31, 2018, 9 pages.
Extended European Search Report for European App. No. 14893926.7 dates Jan. 1, 2018, 9 pages.
Office Action dated May 10, 2018 for U.S. Appl. No. 15/315,046 (pp. 1-9).
Korean Office Action for Korean Pat. App. No. 10-2016-7036917, received Mar. 19, 2018, 13FECT104 KR, 16 pages, English translation included.

\* cited by examiner

MIXER AND DOSER CONE ASSEMBLY

CROSS REFERENCE TO RELATED APPLICATION

This application is a continuation of PCT International Application No. PCT/US2014/040588 filed Jun. 3, 2014. The disclosure of PCT/US2014/040588 is hereby expressly incorporated by reference in its entirety.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. For example, there may be a lower ammonia uniformity index, there may be an increased pressure drop across the mixer, or higher ammonia emissions during active diesel particulate filter (DPF) regeneration.

SUMMARY OF THE INVENTION

In one exemplary embodiment, a vehicle exhaust system includes an exhaust component defining an engine exhaust gas passageway, which includes an opening. A doser defines a doser axis and extends to a doser tip that is configured to spray a reducing agent into the engine exhaust gas passageway through the opening. A cone has a base end positioned adjacent the opening such that an annular gap is formed within the exhaust component around the doser tip. Exhaust gas is directed into the base end of the cone through the annular gap in a direction transverse to the doser axis.

In a further embodiment of the above, the exhaust gas is directed into the base end of the cone in an evenly distributed manner about the annular gap in a direction that is perpendicular to the doser axis.

In a further embodiment of any of the above, the exhaust component comprises a mixer.

In another exemplary embodiment, a method for injecting a reducing agent into an exhaust component includes the steps of; providing an exhaust component defining an engine exhaust gas passageway, the exhaust component including an opening; mounting a doser to the exhaust component, the doser extending to a doser tip that is configured to inject a reducing agent along a doser spray axis and into the engine exhaust gas passageway through the opening; and positioning a base end of a cone adjacent the opening such that an annular gap is formed within the exhaust component around the doser tip, and wherein exhaust gas is directed into the base end of the cone through the annular gap in a direction transverse to the doser spray axis.

These and other features of this application will be best understood from the following specification and drawings, the following of which is a brief description.

DETAILED DESCRIPTION

Figure 1:
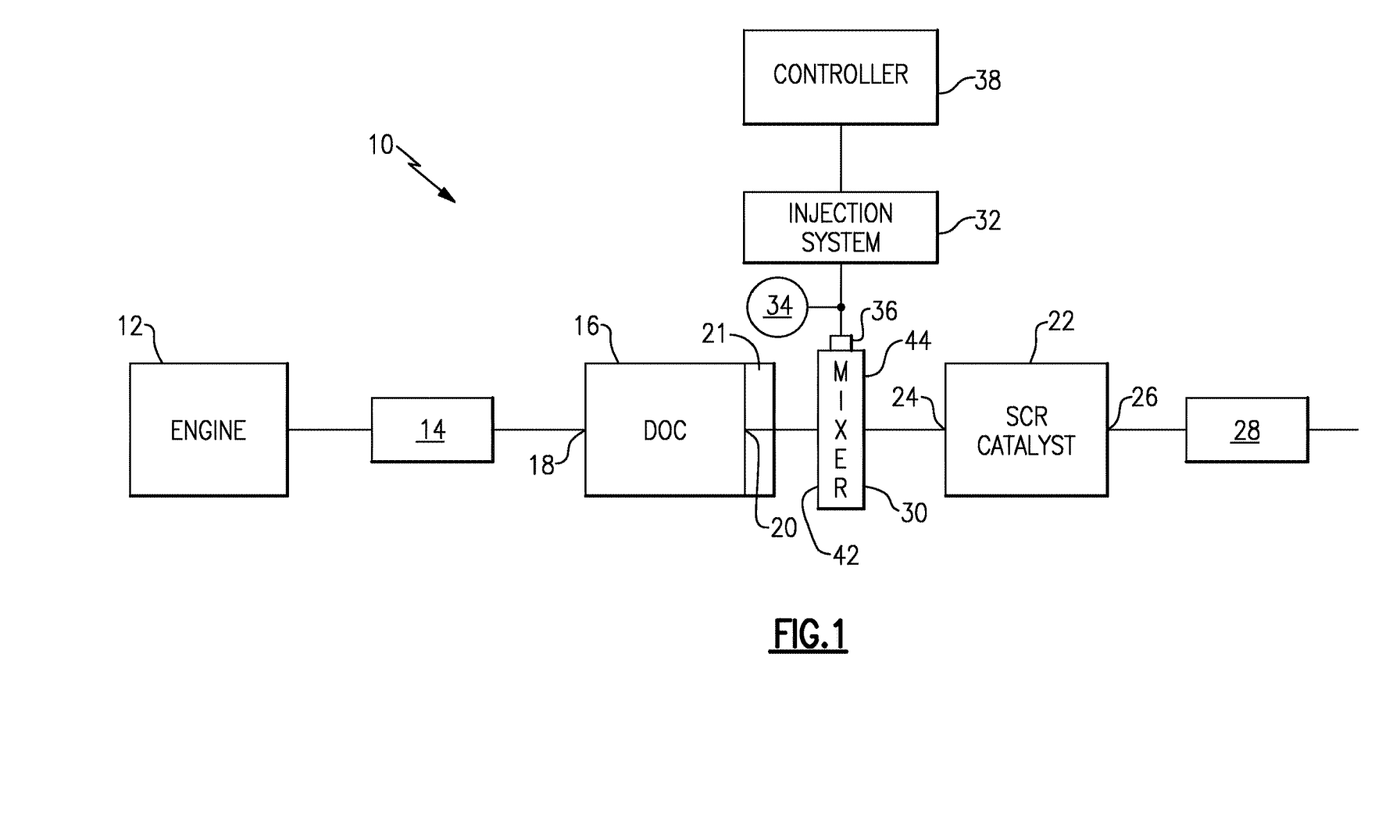
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known.

The mixer 30 comprises a mixer body having an inlet end 42 configured to receive the engine exhaust gases and an outlet end 44 to direct a mixture of swirling engine exhaust gas and products transformed from urea to the SCR catalyst 22. Examples of a mixer 30 that can be used in the exhaust system 10 can be found in US 2012/0216513 and co-pending U.S. application Ser. Nos. 12/57693, 12/57886, and 12/57768 which are also assigned to the assignee of the present application and are hereby incorporated by reference.

Figures 5, 6:
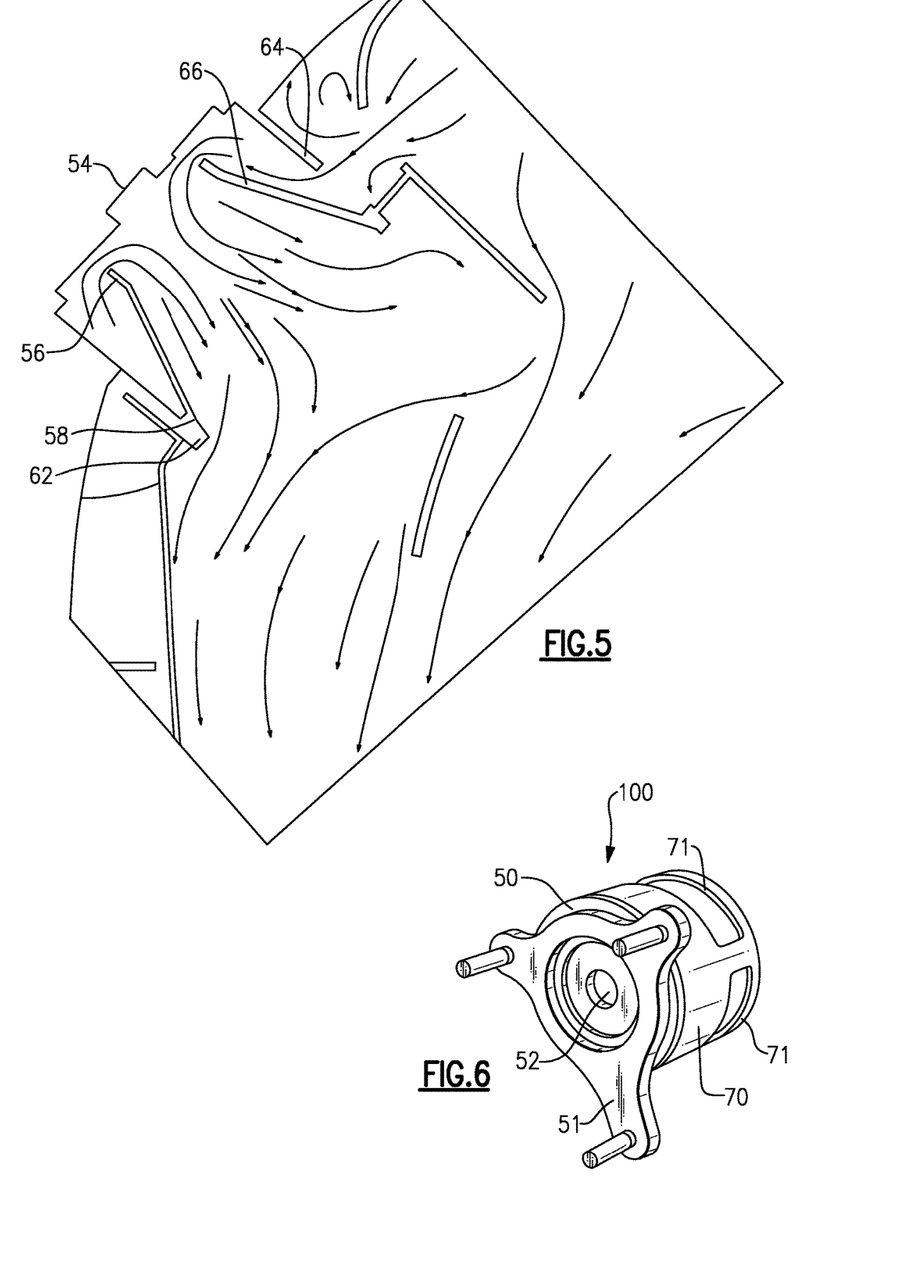
FIG. 5 shows an example flow pattern which directs the spray away from walls of the cone.
FIG. 6 shows a perspective view of the doser sub-assembly.

As shown in FIG. 6, a doser sub-assembly 100 includes a top plate 50 with an opening 52. A doser mount structure 51 abuts against the top plate 50 and holds the doser 36. The doser sub-assembly 100 includes a cylindrical housing 70 with at least one opening 71.

Figure 2:
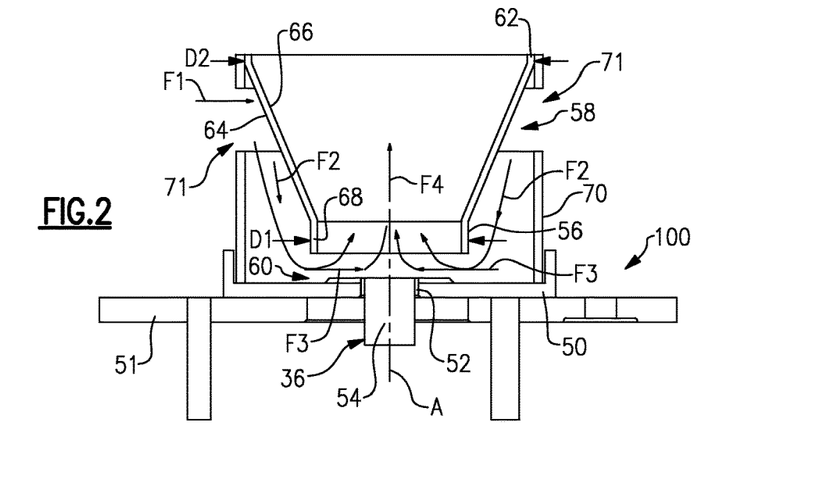
FIG. 2 is a schematic side cross-sectional view of a cone as used in a doser sub-assembly.

As shown in FIG. 2, the doser 36 defines a doser axis A. The doser tip 54 is configured to spray the reducing agent into the mixer 30 through the opening 52. A base end 56 of a cone 58 is positioned adjacent the opening 52 such that an annular gap 60 is formed within the doser sub-assembly 100 around the doser tip 54. Exhaust gas is directed to enter the base end 56 of the cone 58 through the annular gap 60 in a direction transverse to the doser axis A.

The cone 58 extends to a distal end 62 that is defined by a diameter that is greater than a diameter of the base end 56. The cone 58 has an outer surface 64 and an inner surface 66. The base end 56 comprises a tubular section 68 of a generally constant diameter D1 and the distal end 62 is defined by a diameter D2 that is greater than D1. The inner 66 and outer 64 surfaces of the cone 58 taper outwardly from the tubular section 68 to the distal end 62. In one example, the cone 58 is concentric with the doser axis A. In one example, the cone 58 may have a tulip shape.

As shown in FIG. 2, the exhaust gas is directed to enter the base end 56 of the cone 58 in an evenly distributed manner about the annular gap 60 in a direction that is perpendicular to the doser axis A. The cylindrical housing 70 is fixed to the top plate 50 and surrounds at least a portion of the cone 58. The opening 52 is formed in the top plate of the doser-subassembly 100. The housing 70 includes at least one opening 71 to direct exhaust gas in a first flow direction F1 against the outer surface 64 of the cone 58. The exhaust gas then flows in a second flow direction F2 along the outer surface 64 of the cone 58 toward the base end 56. The exhaust gas then flows in a third flow direction F3 to enter the annular gap 60 extending circumferentially around the base end 56. After flowing through the annular gap 60, the exhaust gas flows in a fourth flow direction F4 where it mixes with the reducing agent and to exits the cone 58 at the distal end 62. In one example, the fourth flow direction F4 extends generally along the doser axis A and is opposite of the second flow direction F2. Further, the third flow direction F3 is perpendicular to the fourth flow direction F4.

Figure 8:
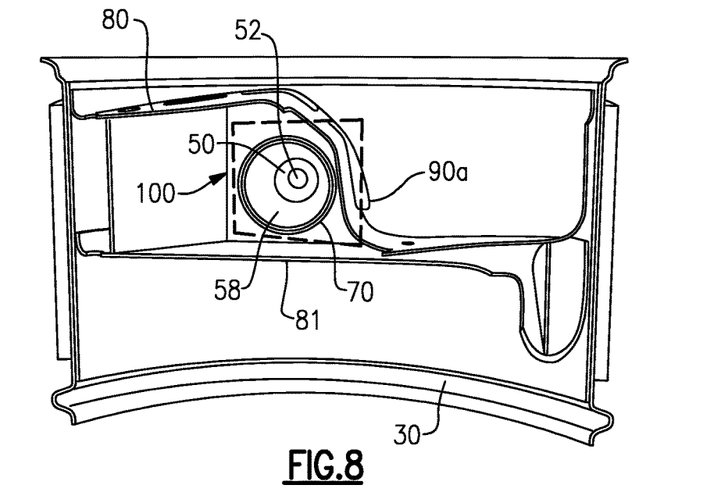
FIG. 8 is an end view of the doser sub-assembly as installed within a mixer.

As shown in FIG. 8, the doser sub-assembly 100 is positioned between an inlet baffle 80 and an outlet baffle 81 of the mixer 30. The inlet baffle 80 is at the upstream end 42 of the mixer 30. The inlet baffle 80 is configured to initiate swirling of the primary exhaust gas flow through the mixer 30.

Figure 3:
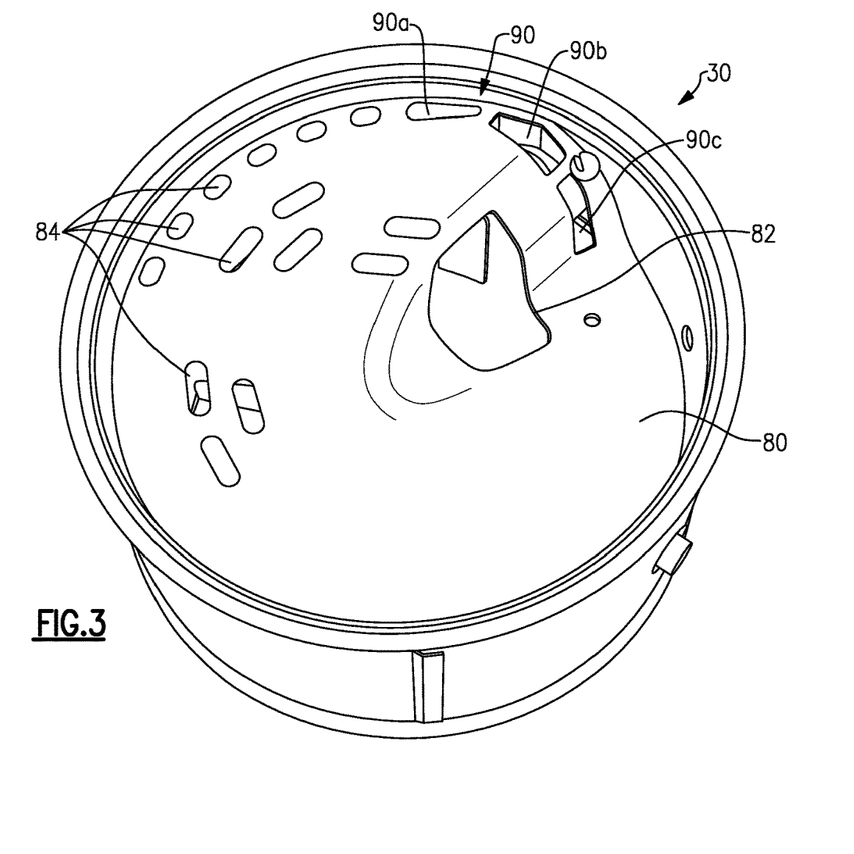
FIG. 3 is an end view of a portion of an inlet baffle of the mixer.

In one example, the inlet baffle 80 includes a large inlet opening 82 (FIG. 3) that receives the majority of the exhaust gas, and which is configured to initiate the swirling motion. The inlet baffle 80 also includes a plurality of perforations, slots, or additional inlet openings 84 that ensure optimal homogenization of exhaust gases and reduces back pressure.

Figure 4:
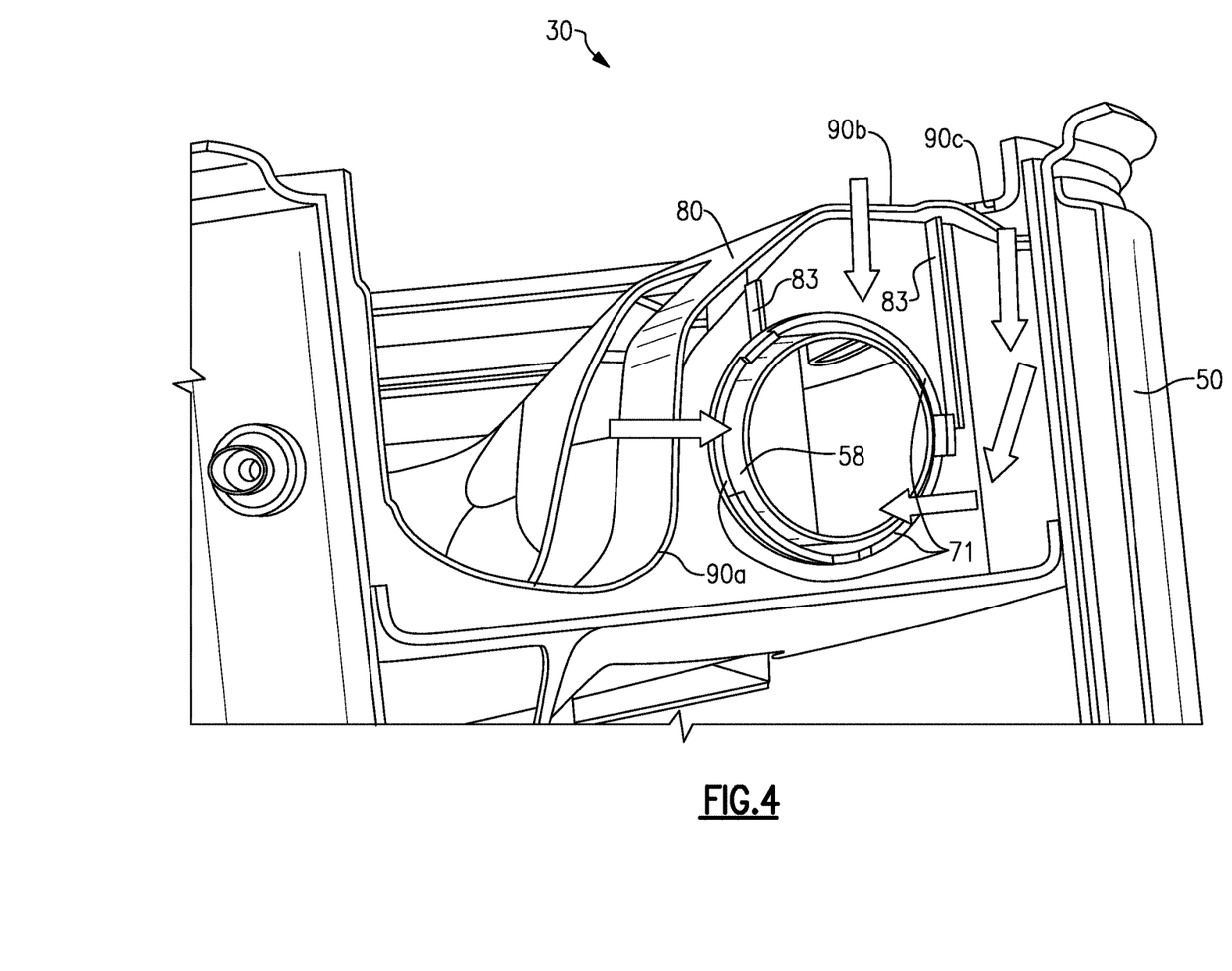
FIG. 4 is end view of the cone showing entry and exit points of exhaust gas flow.

The inlet baffle 80 includes one or more openings 90 that direct a small portion of exhaust gas away from the primary flow path and toward the outer surface 64 of the cone 58 due to the openings 71 located in the housing 70. In one example, three openings 90a, 90b, 90c are used to direct exhaust gas toward the outer surface 64 of the cone 58. The openings 90 and 71 facilitate an even distribution of the gas around the base of the cone 58 (FIG. 4) such that an evenly distributed flow enters the annular gap 60. In one example, the openings 90a, 90b, 90c are spaced apart from each other about an outer peripheral edge of the inlet baffle 80.

The housing 70 doser sub-assembly 100 is shown in greater detail in FIG. 6. In one example, the housing 70 comprises a cylindrical body that completely surrounds the cone 58. The housing 70 includes a plurality of slots 71 that are spaced circumferentially about the cylindrical body. In one example, the number of slots 71 corresponds in number to the number of openings 90a, 90b, and 90c that are in the inlet baffle 80.

Figure 7:
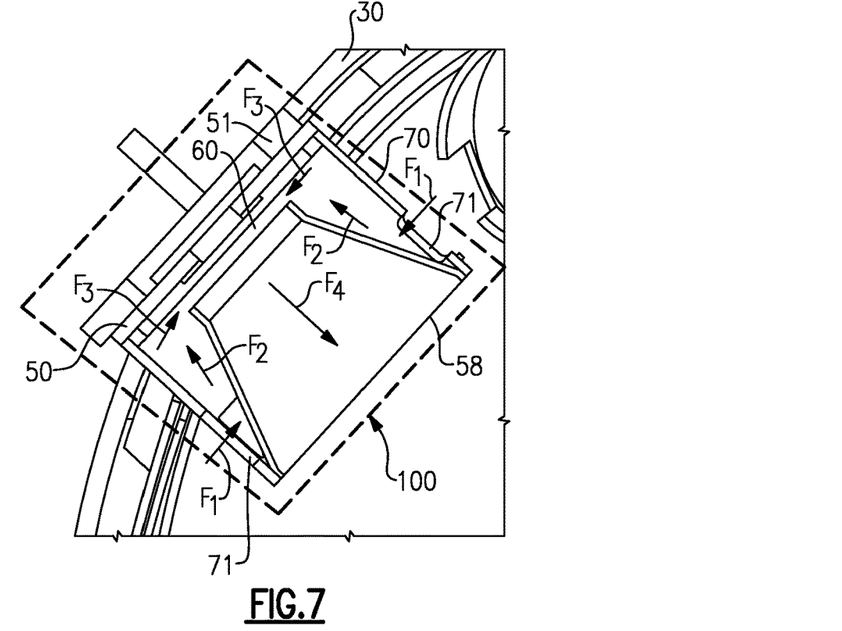
FIG. 7 shows a side cross-sectional view of the doser sub-assembly.

FIG. 7 shows flow in the first direction F1 entering through the slots 71 of the housing 70 and impacting against the outer surface of the cone 58, which forces the flow in the second direction F2 toward a base of the cone 58. Flow then enters the interior of the cone evenly distributed through the gap 60 in the third direction F3. Flow exits the distal end of the cone 58 in the fourth direction F4. FIG. 8 shows the flow exiting from the cone 58 at a position between the inlet 80 and outlet 81 baffles.

Figure 9:
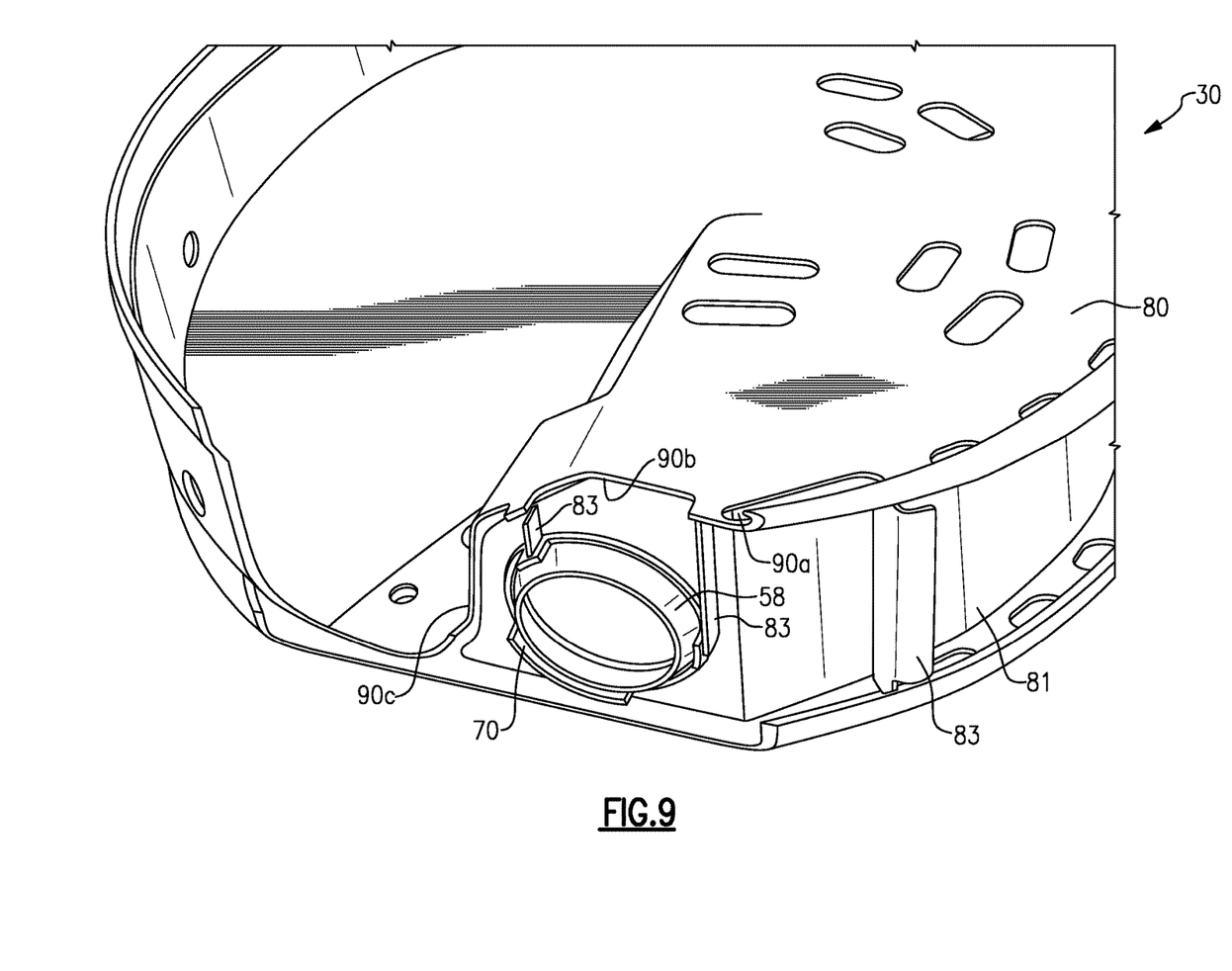
FIG. 9 is an end perspective view of the doser sub-assembly as located between inlet and outlet baffles of the mixer.

As shown in FIG. 9, the mixer 30 includes one or more deflectors 83. The deflectors 83 assist in guiding the flow through the annular gap 60. In one example, at least one deflector 83 is associated with each of the openings 90a, 90b, and 90c in the inlet baffle 80 to direct the flow toward the cone 58 as desired.

The subject invention deviates a small portion of the main exhaust gas stream and reintroduces this exhaust flow in a direction that is perpendicular to a spray direction along the doser axis A. The reintroduction of the exhaust gas is evenly distributed about the annular gap 60 that surrounds the doser tip 54. This generates a trumpet-shaped flow pattern (FIG. 5) that pushes spray droplets away from the tip 54 and away from the inner surface 66 of the cone 58. Further, this flow configuration removes the recirculation zone near the doser tip found in prior designs. The core of the trumpet shape also protects the doser tip 54 to avoid any disruption of the spray. Further, it is important to control the amount of exhaust flow introduced into the annular gap 60 to avoid disrupting the spray. This type of flow configuration is especially effective for dosers that produce small droplet sized spray.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A reducing agent mixer for use with a vehicle exhaust system, the reducing agent mixer comprising a mixer body that defines an engine exhaust gas passageway adapted to house mixing of exhaust gas and reducing agent when exhaust gas moves through the mixer body, a doser arranged outside the mixer body and configured to discharge the reducing agent into the engine exhaust gas passageway along a doser axis, and a reducing agent delivery sub-assembly coupled to the doser and configured to conduct the reducing agent from the doser to the engine exhaust gas passageway and the reducing agent delivery sub-assembly including a plate formed to define an opening aligned with the doser axis, a cone arranged to be spaced apart from the plate along the doser axis to define an annular gap between the plate and the cone, and a cylindrical housing coupled to the plate and arranged around the cone to define a housing passageway that is fluidly connected with the engine exhaust gas passageway and the annular gap, wherein the cylindrical housing is formed to include a plurality of inlet slots that are circumferentially spaced apart from one another so that exhaust gas is directed from the engine exhaust gas passageway through the housing passageway and the annular gap into the cone in a distributed manner about the doser axis during use of the reducing agent mixer, and wherein the cone includes a base end located toward the plate and a distal end that is spaced apart from the base end and the plate along the doser axis and the plurality of inlet slots formed in the cylindrical housing are axially spaced apart from the base end and the distal end of the cone along the dose axis.

2. The reducing agent mixer of claim 1, wherein the plurality of inlet slots are arranged to conduct exhaust gas into the housing passageway at a first location and at a second location that is circumferentially spaced apart from the first location by 180 degrees.

3. The reducing agent mixer of claim 1, wherein the cone includes a frustoconical portion and a cylindrical portion arranged to extend axially along the doser axis from the frustoconical portion toward the plate.

4. The reducing agent mixer of claim 3, wherein the cone includes a base end located toward the plate and a distal end that is spaced apart from the base end and the plate along the doser axis and the cylindrical housing is coupled to the distal end of the cone.

5. The reducing agent mixer of claim 1, further comprising an inlet baffle positioned upstream of the reducing agent delivery sub-assembly and at least one of the inlet slots is located radially between the doser axis and the inlet baffle.

6. The reducing agent mixer of claim 5, wherein the inlet baffle is formed to include a primary opening configured to direct a majority of an exhaust gas stream through the mixer body and a plurality of secondary openings configured to deviate a portion of the exhaust gas stream toward the cylindrical housing and through at least one of the plurality of inlet slots formed in the cylindrical housing.

7. The reducing agent mixer of claim 6, wherein each of the plurality of secondary openings are spaced apart from each other about an outer peripheral edge of the inlet baffle.

8. A reducing agent delivery sub-assembly for use with a vehicle exhaust system, the reducing agent delivery sub-assembly comprising a plate formed to define an opening, a cone extending along an axis that extends through the opening in the plate, the cone having a base end and a distal end, the base end of the cone being spaced apart from the plate to define an annular gap around the opening, and a cylindrical housing coupled to the plate and arranged around the cone to define a housing passageway between the cylindrical housing and the cone, the housing passageway fluidly connected with the annular gap, and the cylindrical housing formed to include at least one inlet opening arranged to direct exhaust gas from the housing passageway into the base end of the cone through the annular gap in a direction transverse to the doser axis, the at least one inlet opening configured such that all exhaust gas in the housing passageway is directed into the base end of the cone during use of the reducing agent delivery sub-assembly, wherein the at least one inlet opening formed in the cylindrical housing is spaced apart axially from the base end and the distal end of the cone.

9. The reducing agent delivery sub-assembly of claim 8, wherein the at least one inlet opening is formed to conduct exhaust gas into the housing passageway at a first location and at a second location that is circumferentially spaced apart from the first location by 180 degrees.

10. The reducing agent delivery sub-assembly of claim 8, wherein the cone includes a frustoconical portion and a cylindrical portion arranged to extend axially from the frustoconical portion toward the plate.

11. The reducing agent delivery sub-assembly of claim 10, wherein the at least one inlet opening formed in the cylindrical housing is spaced apart axially from the base end and the distal end of the cone.

12. The reducing agent delivery sub-assembly of claim 8, wherein the cylindrical housing is formed to include a cutout that defines the at least one inlet opening.

13. The reducing agent delivery sub-assembly of claim 8, wherein the at least one inlet opening includes three inlet slots and each of the three inlet slots extend circumferentially partway around the cylindrical housing to cause exhaust gas to be conducted into the base end of the cone in an evenly distributed manner about the annular gap.

14. A reducing agent mixer for use with a vehicle exhaust system, the reducing agent mixer comprising a mixer body that defines an engine exhaust gas passageway adapted to house mixing of exhaust gas and reducing agent when exhaust gas moves through the mixer body, a doser arranged outside the mixer body and configured to discharge the reducing agent into the engine exhaust gas passageway along a doser axis, and a reducing agent delivery sub-assembly coupled to the doser and configured to conduct the reducing agent from the doser to the engine exhaust gas passageway and the reducing agent delivery sub-assembly including a plate formed to define an opening aligned with the doser axis, a cone arranged to be spaced apart from the plate along the doser axis to define an annular gap between the plate and the cone, and a cylindrical housing coupled to the plate and arranged around the cone to define a housing passageway that is fluidly connected with the engine exhaust gas passageway and the annular gap, wherein the annular gap is arranged inside the engine exhaust gas passageway defined by the mixer body, and wherein the cylindrical housing is formed to include a plurality of inlet slots that are circumferentially spaced apart from one another so that exhaust gas is directed from the engine exhaust gas passageway through the housing passageway and the annular gap into the cone in a distributed manner about the doser axis during use of the reducing agent mixer.

15. The reducing agent mixer of claim 14, wherein the plurality of inlet slots are arranged to conduct exhaust gas into the housing passageway at a first location and at a second location that is circumferentially spaced apart from the first location by 180 degrees.

16. The reducing agent mixer of claim 14, wherein the cone includes a frustoconical portion and a cylindrical portion arranged to extend axially along the doser axis from the frustoconical portion toward the plate.

17. The reducing agent mixer of claim 14, wherein the cone includes a base end located toward the plate and a distal end that is spaced apart from the base end and the plate along the doser axis and the plurality of inlet slots formed in the cylindrical housing are axially spaced apart from the base end and the distal end of the cone along the dose axis.

\* \* \* \* \*